Feb. 11, 1930.                J. C. SCHELLIN                1,746,609
                            SHUT-OFF HOSE NOZZLE
                            Filed May 31, 1927

INVENTOR:
John C. Schellin
By Hiram B. Swartz, Atty

Patented Feb. 11, 1930

1,746,609

UNITED STATES PATENT OFFICE

JOHN C. SCHELLIN, OF WOOSTER, OHIO

SHUT-OFF HOSE NOZZLE

Application filed May 31, 1927. Serial No. 195,510.

My invention relates to improvements in shut-off nozzles for fire hose use, and the like; and its principal objects are, first, to provide a rotary "ball valve", so constructed and adjusted as not to come in contact with the outer casing of the nozzle except at its axis, and provide an open space around the ball for safety and for a water jacket, whereby the shut-off valve is made to turn on and off more easily than has been possible heretofore, and accumulation of sand and other debris in the valve is avoided; secondly, to provide improved means for directing the flow of water thru the nozzle, to prevent vibration and fill the water jacket; thirdly, to provide an open space for said water jacket between the outer casing of the nozzle and the shut-off valve whereby danger of rendering the valve of the nozzle inoperative by denting, bending or other external injury by falling on hard surfaces is lessened; fourthly, to provide an adjustable and removable valve seat on opposite sides of the ball valve, each adapted to fit over a segment of the globular surface around the orifice of the ball, one seat fitted to seal the water passage thru the nozzle, and the other to concentrate the stream and also fill the water jacket; and fifthly, to provide improved means for reseating and evenly grinding and polishing the valve seats.

It consists broadly of the novel construction and combination of elements for accomplishing said objects and other kindred features, as hereinafter fully set forth and stated in the appended claims.

My invention is illustrated by the accompanying drawing in which similar letters and figures indicate like parts.

Figure 1:
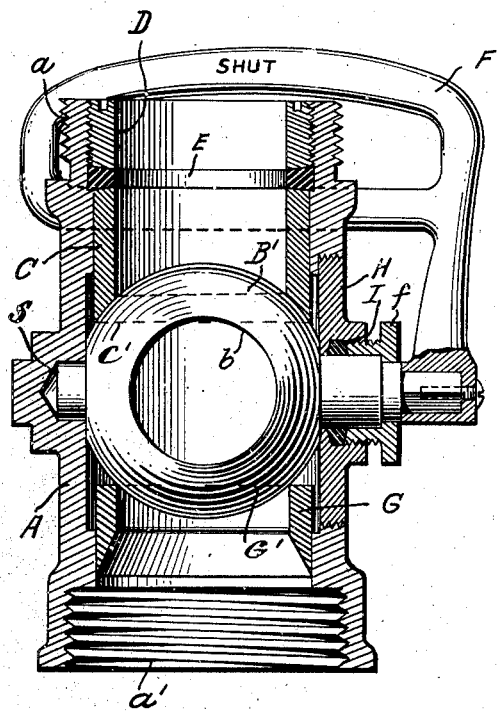
Figure 2:
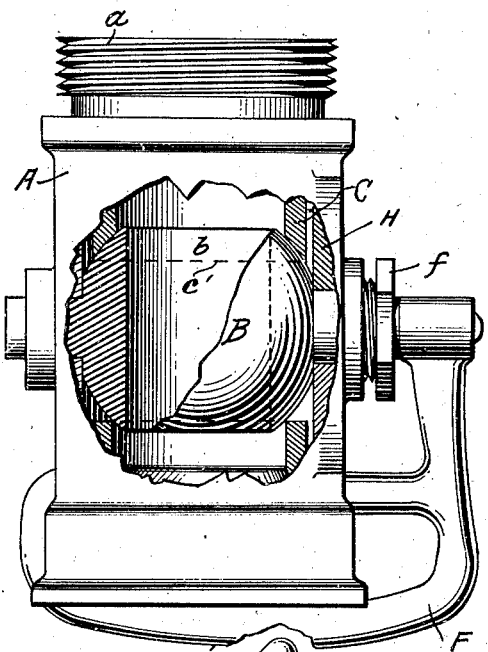
Figures 3, 4:
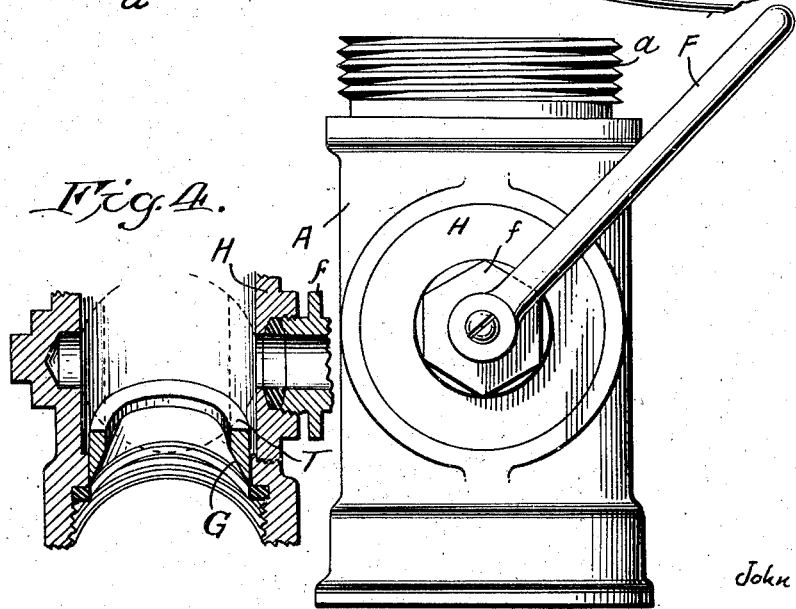

Referring thereto, Fig. 1 is a side view of the valve portion of the hose nozzle, partly cut away along one side thereof to show the interior mechanism when the valve ball is turned to shut-off position; and Fig. 2 is a longitudinal section of the same, showing the ball valve turned to open position, and the means for adjusting the pressure on the ball to make the valve water tight. Fig. 3 is a side view of the hose nozzle valve case. Fig. 4 is a perspective view of Fig. 1 drawn on a reduced scale. In the drawings, A indicates the outer casing or body portion of the shut-off nozzle, B, the valve rotary ball having a central aperture $b$ equal in diameter to the bore of the nozzle which is to be joined thereto on the helical threaded end $a$. The ball is mounted on a transverse shaft S, which is operable externally by the handle F, as shown in Fig. 1, the shaft being mounted for rocking in bearings in the valve body A, and in a threaded plate H, and adjustably secured and made water tight by means of a gasket I, which is held under pressure of the threaded nut $f$ around the shaft, as shown in Fig. 2. A short adjustable tube C is fitted over the ball center, and this tube may be readily removed by the removal of the threaded short sleeve D.

Resilient pressure may be made on the ball seat by means of a gasket E which intervenes between the upper end of the tube C and the lower end of the threaded sleeve D, and thus makes the joint between the ball and tube water tight, and the ball to be easily turned by the handle F. Hose connection is made with the valve body by means of the threaded end $a'$ in the usual way; and the stream of water is gradually concentrated and directed thru the orifice $b$ in the ball, by a tubular member G secured immediately below the ball within the body A, as shown in the drawings. Said tubular member is adjustably mounted in the casing A, below the ball valve B, and extends upwardly a short distance into the water jacket aforesaid and so as to surround a segment of the ball which is aligned with the orifice therethru, and is adjustably held in relative position within the casing walls so as to normally rest loosely against the adjacent surface of the ball valve, without being water tight.

It is sloped from within outwardly for the purpose of concentrating the inflowing stream into the smaller orifice of the nozzle without vibration, and also supplying the water jacket by the inflowing stream automatically. If preferred the terminus of the tubular member G, may be made to register exactly with the concavity of the ball, but the fitting should not be tight enough to prevent sufficient inflow to fill the water jacket. By said means the stream of water flows unobstructedly thru the nozzle orifice without jarring or vibrating the nozzle.

The lower end of the tubular member C may be made concave and ground to fit snugly upon the globular surface of the ball B, so that when the latter is turned to shut-off position, as in B', Fig. 1, there can be no water leakage thru the nozzle; and when turned to open position, as at B, Fig. 2, the tubular member fits closely around the orifice *b* in the ball, as shown by the dotted lines around the latter. Wear of the joint between the ball and said tubular member C may be compensated and the joint adjustably tightened or loosened by means of the threaded sleeve D; and the gasket E may thus be pressed outwardly between the sloping edges of said tube and sleeve, so as to prevent leakage between said members; and by the removal of both of said members and the yieldable gasket E, the surface of the ball may be reground, and the co-acting tubular members re-fitted at pleasure.

I am aware it is not new to provide a rotary valve in shut-off nozzles, and such I do not broadly claim—

But what I claim as new and desire to secure by Letters Patent is—

1. A shut-off hose nozzle, comprising in combination with the nozzle, an outer casing hollowed out longitudinally, a revoluble ball valve mounted on an axis to rock transversely within said casing, an open space between the ball valve and the inner surface of said casing for a water jacket around the ball and to protect it from injury, an orifice thru the ball at right angles with said axis, a tubular member adjustably mounted within said casing above the ball and extended into said water jacket space, a sleeve having like diameter as said tubular member threaded into the casing wall, and a resilient gasket between the tubular member and sleeve, and a handle to rock the ball valve over the contiguous end of the tubular member, substantially as set forth.

2. A shut-off hose nozzle, comprising in combination, an outer casing hollowed out longitudinally, a revoluble ball valve mounted to rock on an axis transversely in said casing, an open space for a water jacket around said ball, an orifice thru said ball at right angles with axis, a tubular member adjustably mounted within said casing fitted to register with said orifice and said ball surface, a threaded sleeve adjustably mounted within said casing above said tubular member, having an orifice of like diameter aligned therewith, and a resilient gasket intermediate said tubular member and said sleeve, said tubular member extended into said open space around said ball; a tubular member adjustably mounted within said casing below said ball valve extending into said open space around said ball and fitted to register loosely with said ball surface around its orifice, the inner walls of said lower tubular member sloped downwardly and outwardly to concentrate and regulate the flow of water thru the orifice and supply the water jacket, and a handle to rock the ball on its axis, substantially as set forth.

In witness whereof, I hereunto set my hand this 2d day of April, 1927.

JOHN C. SCHELLIN.